(12) United States Patent
Miyashita et al.

(10) Patent No.: US 9,959,901 B1
(45) Date of Patent: May 1, 2018

(54) INSPECTION METHOD FOR OPTICAL DISC

(71) Applicant: Panasonic Intellectual Property Management Co., Ltd., Osaka (JP)

(72) Inventors: Harumitsu Miyashita, Nara (JP); Yasumori Hino, Nara (JP); Junichi Minamino, Nara (JP); Tsutomu Kai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/427,643

(22) Filed: Feb. 8, 2017

(30) Foreign Application Priority Data

Oct. 12, 2016 (JP) .................................. 2016-201195
Jan. 23, 2017 (JP) .................................. 2017-009771

(51) Int. Cl.
  *G11B 20/18* (2006.01)
  *G11B 20/12* (2006.01)
  *G11B 7/09* (2006.01)
  *G11B 19/04* (2006.01)
  *G11B 20/10* (2006.01)
  *G11B 7/0037* (2006.01)

(52) U.S. Cl.
  CPC ........ *G11B 20/1816* (2013.01); *G11B 7/0948* (2013.01); *G11B 19/041* (2013.01); *G11B 20/10314* (2013.01); *G11B 20/1217* (2013.01); *G11B 20/18* (2013.01); *G11B 7/0037* (2013.01); *G11B 2020/1238* (2013.01)

(58) Field of Classification Search
  None
  See application file for complete search history.

(56) References Cited

U.S. PATENT DOCUMENTS

| 2001/0022763 | A1 | 9/2001 | Ishibashi |
| 2010/0097906 | A1 | 4/2010 | Watanabe et al. |
| 2015/0074692 | A1 | 3/2015 | Yoshida et al. |
| 2015/0213828 | A1 | 7/2015 | Yasukawa et al. |
| 2015/0380043 | A1 | 12/2015 | Yoshida et al. |

FOREIGN PATENT DOCUMENTS

| JP | 10-040546 | 2/1998 |
| JP | 2001-256649 | 9/2001 |
| JP | 2001-332030 | 11/2001 |
| JP | 2010-118134 | 5/2010 |
| JP | 2013-229087 | 11/2013 |
| JP | 2015-141727 | 8/2015 |

*Primary Examiner* — Brian Butcher
(74) *Attorney, Agent, or Firm* — Renner, Otto, Boisselle & Sklar, LLP (57) ABSTRACT

An inspection method for a recordable optical disc includes focusing laser light on a recording layer and obtaining a data signal dependent on the laser light reflected by the recording layer. The inspection method also includes determining whether the optical disc includes a defect or not by identifying a first period every second period in the obtained data signal obtained, the first period being a period in which a signal level of the data signal is lower than a predetermined value, and each of the second periods corresponding to an ECC block, and outputting a result of the determination.

1 Claim, 8 Drawing Sheets

INSPECTION METHOD FOR OPTICAL DISC

CROSS REFERENCE TO RELATED APPLICATIONS

This application claims the benefit of priority of Japanese Patent Application Number 2016-201195 filed on Oct. 12, 2016, and Japanese Patent Application Number 2017-9771 filed on Jan. 23, 2017, the entire content of which is hereby incorporated by reference.

BACKGROUND

1. Technical Field

The present disclosure relates to an inspection method for verifying whether or not an optical disc is in a state in which data can be properly recorded onto or played back from the optical disc.

2. Description of the Related Art

Optical discs on which information (data) is recordable are widespread and widely used. Japanese Unexamined Patent Application Publication No. H10-40546 discloses an optical disc defect inspection method for detecting a defect in an optical disc, such as a scratch or stain on the surface.

SUMMARY

The present disclosure provides an inspection method for verifying with high precision whether or not an optical disc is in a state in which data can be properly recorded onto or played back from the optical disc.

The inspection method according to the present disclosure is an inspection method for an optical disc that is recordable. The inspection method includes: focusing laser light on a recording layer included in the optical disc, the recording layer including a plurality of recording units in which error correction is performed when the optical disc is recorded with data; obtaining an electrical signal dependent on the laser light reflected by the recording layer; determining whether the optical disc includes a defect or not by identifying a first period every second period in the electrical signal obtained, the first period being a period in which a signal level of the electrical signal is lower than a predetermined value, and each of the second periods corresponding to one of the plurality of recording units; and outputting a result of the determining.

The inspection method according to the present disclosure can verify with high precision whether or not an optical disc is in a state in which data can be properly recorded onto or played back from the optical disc.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, a non-limiting embodiment will be described in detail with reference to the drawings. However, unnecessarily detailed description may be omitted. For example, details regarding known facts or duplicate explanations of two or more essentially identical configurations may be omitted. This is to facilitate easy understanding of the embodiment by those skilled in the art and avoid redundant description.

Note that the Inventors have provided the appended drawings and the following description to facilitate sufficient comprehension of the present disclosure by those skilled in the art; the appended drawings and the following description are not intended to limit the scope of appended claims. The appended drawings are schematic drawings and are not necessarily precise depictions. Moreover, in the appended drawings, like elements share like reference signs, and as such, duplicate explanation thereof is omitted or abridged.

Embodiment (Information Recording System Outline)

Figure 1:
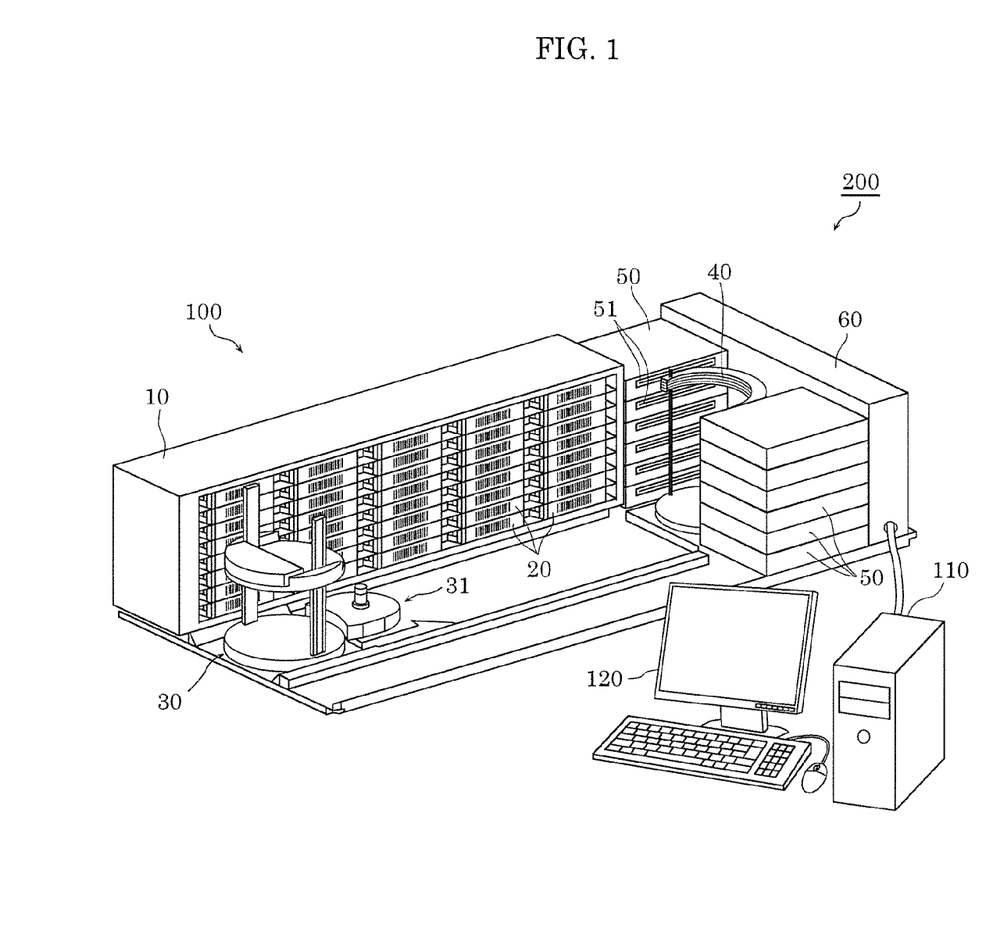
FIG. 1 is an external perspective view of an information recording system according to an embodiment.

First, the information recording system according to this embodiment will be outlined. FIG. 1 is an external perspective view of the information recording system according to this embodiment.

As illustrated in FIG. 1, information recording system 200 includes information recording apparatus 100, information terminal 110, and display device 120.

Information recording apparatus 100 is a data archiver that stores data using a plurality of optical discs. Information terminal 110 and display device 120 are user interfaces in information recording system 200. Using information terminal 110 and display device 120, a user can read information recorded on information recording apparatus 100 and execute a recording instruction for recording information in information recording apparatus 100.

More specifically, information recording apparatus 100 includes magazine cabinet 10, a plurality of magazines 20, picker 30, carrier 40, a plurality of disc drives 50, and control device 60.

Figure 2:
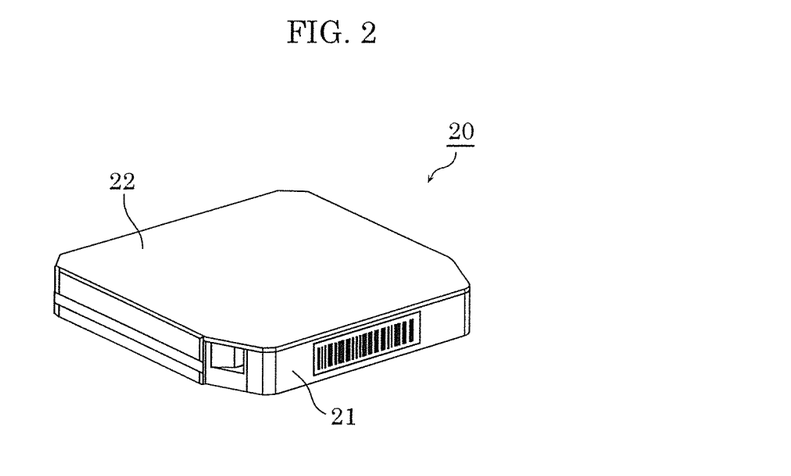
FIG. 2 is an external perspective view of a magazine.

Each magazine 20 is a container that houses a plurality of optical discs. FIG. 2 is an external perspective view of magazine 20, and FIG. 3 is an exploded perspective view of magazine 20.

Figure 3:
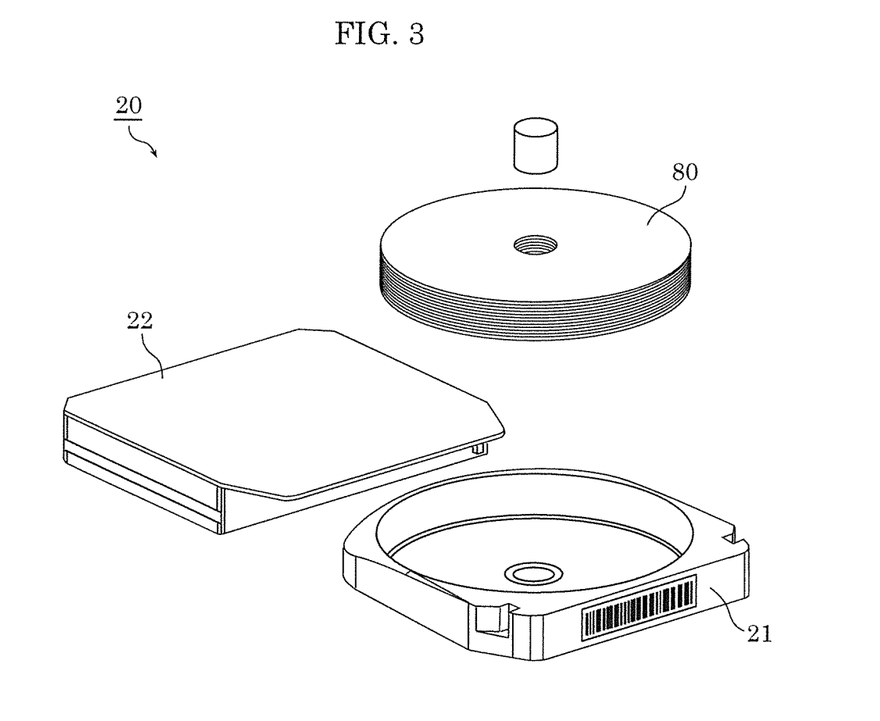
FIG. 3 is an exploded perspective view of a magazine.

As illustrated in FIG. 2 and FIG. 3, magazine 20 includes magazine tray 21 that houses optical discs 80 stacked in the top-bottom direction, and case 22 that houses magazine tray 21. A single magazine tray 21 houses, for example, twelve optical discs 80.

Optical disc 80 is a disc-shaped storage medium. In this embodiment, optical disc 80 is a recordable optical disc (optical disc capable of being recorded in multiple sessions), and, for example, is recorded with approximately 100 GB of data per disc. Note that optical disc 80 capable of being recorded in multiple sessions is a recording medium on which information is additionally recorded, and once data is recorded, the data cannot be modified.

Picker 30 selects one magazine 20 from the plurality of magazines 20 housed in magazine cabinet 10, and removes magazine tray 21 from the selected magazine 20. Moreover, picker 30 holds and transports removed magazine tray 21 to the vicinity of disc drives 50. Picker 30 includes separator 31 which separates optical discs 80 in magazine tray 21 from one another to keep optical discs 80 from contacting one another.

Carrier 40 receives optical discs 80 separated by separator 31, while still separated, and inserts optical discs 80 into insertion openings 51 of disc drives 50 one disc at a time.

Disc drives 50 are devices that record information onto optical discs 80 and playback optical discs 80. Disc drives 50 are slot-loading disc drives that are loaded with optical discs 80 without the use of trays. Disc drives 50 are stacked in a top-bottom direction (i.e., stacked height-wise). The total number of disc drives 50 included in information recording apparatus 100 is equal to the total number of optical discs 80 housed in a single magazine 20, and in this embodiment, is twelve.

Control device 60 controls operation of each device, such as picker 30, carrier 40, and disc drives 50.

Information recording apparatus 100 described above inspects magazines 20 before using magazines 20. More specifically, information recording apparatus 100 verifies whether or not there are any scratches or extraneous matter on an unrecorded optical disc 80 in magazine 20.

(Optical Disc Structure)

Figure 4:
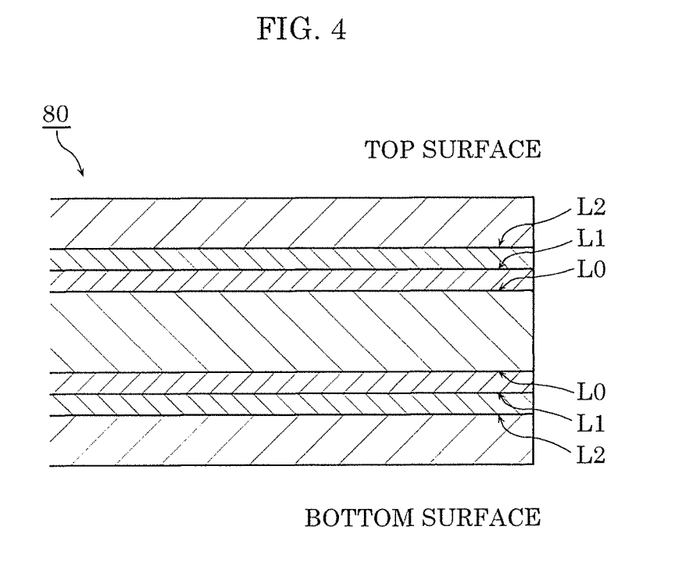
FIG. 4 is a schematic cross sectional view of the structure of an optical disc recording layer.
Figure 5:
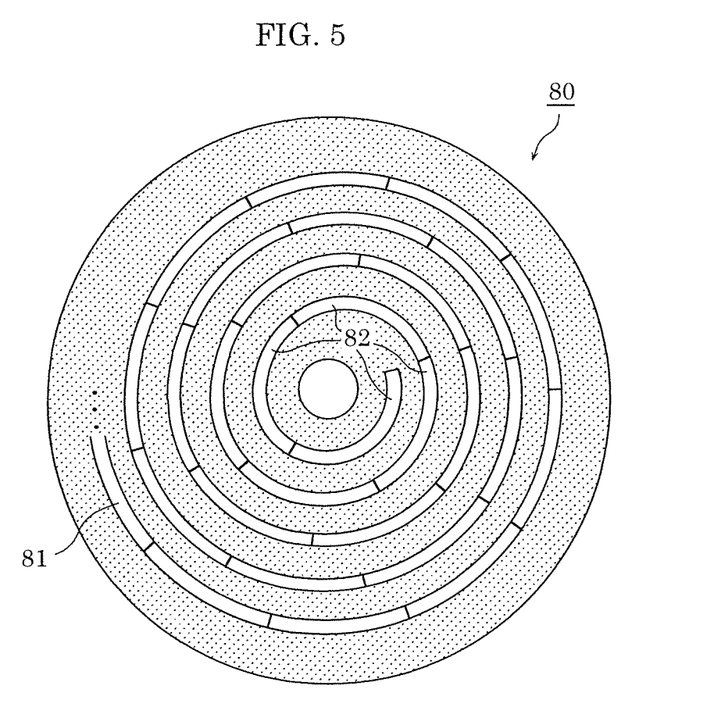
FIG. 5 is a plan view of the structure of an optical disc recording layer.

Next, the recording layer structure of optical discs 80 will be described. FIG. 4 is a schematic cross sectional view of the structure of an optical disc recording layer. FIG. 5 is a plan view of the structure of an optical disc recording layer.

As described above, optical discs 80 are recordable optical discs (optical disc capable of being recorded in multiple sessions). As illustrated in FIG. 4, optical disc 80 includes three recording layers in each of the top and bottom surfaces. The three recording layers on the top surface side of optical disc 80 are Layer0 (L0 in FIG. 4), Layer1 (L1 in FIG. 4), and Layer2 (L2 in FIG. 4), and the three recording layers on the bottom surface side of optical disc 80 are Layer0, Layer1, and Layer2.

Moreover, as illustrated in FIG. 5, in one recording layer, a spiral groove is formed spiraling from the vicinity of the center of optical disc 80, and either the groove or land (region between two adjacent sections of the groove) form track 81 on which recording marks are to be formed. Note that both the groove and land may form track 81.

Track 81 is divided into a plurality of error correcting code (ECC) blocks 82. Stated differently, ECC blocks 82 form the spiral track in the recording layer. ECC block 82 is one example of the recording unit, and is a unit in which error correction is performed in the case that optical disc 80 is recorded with data.

Track 81 (groove) includes a slight wobble that wobbles along track 81, and disc drives 50 can recognize the wobble as address information in optical disc 80. Employing wobbles makes it possible for disc drives 50 to assuredly identify addresses even before optical discs 80 are recorded with data.

(Information Recording System Functional Configuration)

Figure 6:
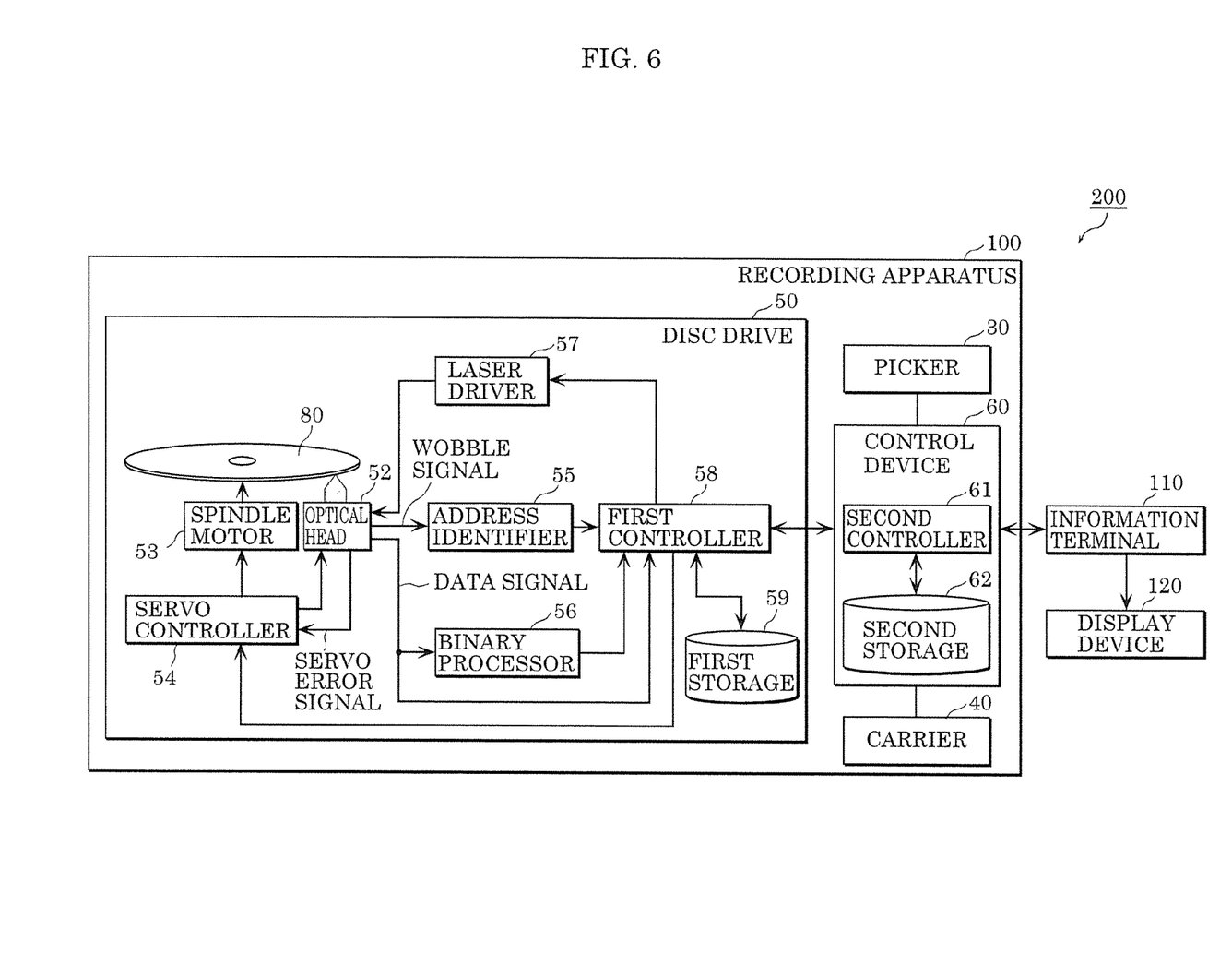
FIG. 6 is a block diagram illustrating the functional configuration of an information recording system according to an embodiment.

Next, the functional configuration of information recording system 200 will be described. FIG. 6 is a block diagram illustrating the functional configuration of information recording system 200.

As illustrated in FIG. 6, information recording system 200 includes information recording apparatus 100, information terminal 110, and display device 120. Information terminal 110 is, for example, a personal computer, and display device 120 is, for example, a liquid crystal display.

Moreover, information recording apparatus 100 mainly includes disc drives 50 and control device 60. First, the configuration of disc drives 50 will be described in detail. Each disc drive 50 includes optical head 52, spindle motor 53, servo controller 54, address identifier 55, binary processor 56, laser driver 57, first controller 58, and first storage 59.

Optical head 52 focuses laser light on a recording layer in optical disc 80, and receives laser light reflected by the recording layer in optical disc 80. Moreover, optical head 52 converts the received laser light into electrical signals and outputs the converted electrical signals. Optical head 52 outputs, as the electrical signals, a wobble signal, a servo error signal, and a data signal. More specifically, optical head 52 is an optical pickup device, and includes a laser light source that emits laser light, and a photodetector (photodiode) that converts laser light into electrical signals.

The wobble signal is a signal dependent on the wobble in optical disc 80, and is a signal that indicates an address of a position at which the laser light is focused in track 81 (i.e., the laser focal point). The servo error signal is a signal for focusing the laser light on a recording layer and tracking the laser focal point along track 81. The data signal is a signal indicating data recorded in track 81.

Spindle motor 53 spins optical disc 80 under control by servo controller 54. Servo controller 54 focuses the laser light onto a recording layer on the basis of the servo error signal output from optical head 52, and controls the tracking of the laser focal point along track 81. Moreover, servo controller 54 controls the rotational speed of spindle motor 53. Servo controller 54 is controlled by, for example, first controller 58.

Address identifier 55 identifies the address of the laser focal point of the laser light on a recording layer, based on the wobble signal. More specifically, address identifier 55 includes an analog-to-digital (ADC) converter. The ADC circuit performs analog signal processing on the wobble signal, such as high-pass filter (HPF) processing, which reduces DC fluctuations, low-pass filter (LPF) processing, which removes unwanted high-frequency noise from playback of the wobble signal, and automatic gain control (AGC) processing, which reduces amplitude fluctuations in the wobble signal.

Moreover, address identifier 55 further includes a phase-locked loop (PLL) circuit and a demodulation circuit. Using a clock signal provided by the PLL circuit, the ADC circuit digitizes the wobble signal after the wobble signal has undergone the analog signal processing. The PLL circuit generates and outputs a clock signal in synchronization with the wobble signal that has been digitized and undergone BPF processing. The demodulation circuit demodulates address information from the sampled wobble signal on the basis of the clock signal output from the PLL circuit. As a result, the address of the laser focal point on the recording layer is identified.

Binary processor 56 performs binarization processing on the data signal output from optical head 52. More specifically, binary processor 56 includes an ADC circuit. The ADC circuit performs analog signal processing on the data signal, such as HPF processing, which reduces DC fluctuations, LPF processing, which removes high-frequency noise unnecessary for the binarization, and AGC processing, which reduces amplitude fluctuations in the data signal.

Moreover, binary processor 56 further includes a PLL circuit, an adaptive filter, and a demodulation circuit. The ADC circuit digitizes the data signal using a clock signal provided by the PLL circuit. The digitized data signal is filtered by the adaptive filter and then converted into binary data by the demodulation circuit. Although not shown in detail in the drawings, note that thereafter error correction processing, for example, is performed on the binary data.

Laser driver 57 causes optical head 52 to emit laser light under control by first controller 58. More specifically, laser driver 57 includes a drive circuit for a semiconductor laser. Note that laser driver 57 may be included in optical head 52.

First controller 58 controls each element included in disc drive 50 and communicates with control device 60. More specifically, first controller 58 is realized as a processor, microcomputer, or a dedicated circuit. First controller 58 may be realized as a combination of two or more of the processor, microcomputer, and dedicated circuit. Although not shown in detail in the drawings, note that a communication interface (communication circuit) is provided between first controller 58 and control device 60.

First storage 59 is a storage device for storing, for example, a control program to be executed by first controller 58. More specifically, first storage 59 is realized as semiconductor memory.

Next, control device 60 will be described. Control device 60 includes second controller 61 and second storage 62.

For example, second controller 61 controls operation of each device, such as picker 30, carrier 40, and disc drives 50, based on instruction from information terminal 110. More specifically, second controller 61 is realized as a processor, microcomputer, or a dedicated circuit. Second controller 61 may be realized as a combination of two or more of the processor, microcomputer, and dedicated circuit. Although not shown in detail in the drawings, note that a communication interface (communication circuit) is provided between second controller 61 and information terminal 110.

Moreover, before information recording apparatus 100 is used—that is to say, in a state in which optical discs 80 in magazines 20 are unrecorded—second controller 61 verifies whether or not there are any scratches or extraneous matter on an unrecorded optical disc 80 in magazine 20. This sort of verification will be described in detail later.

Second storage 62 is a storage device for storing, for example, a control program to be executed by second controller 61. This control program includes a program for inspecting optical disc 80 (magazine 20). More specifically, second storage 62 is realized as semiconductor memory.

(Optical Disc Inspection Method)

Figure 7:
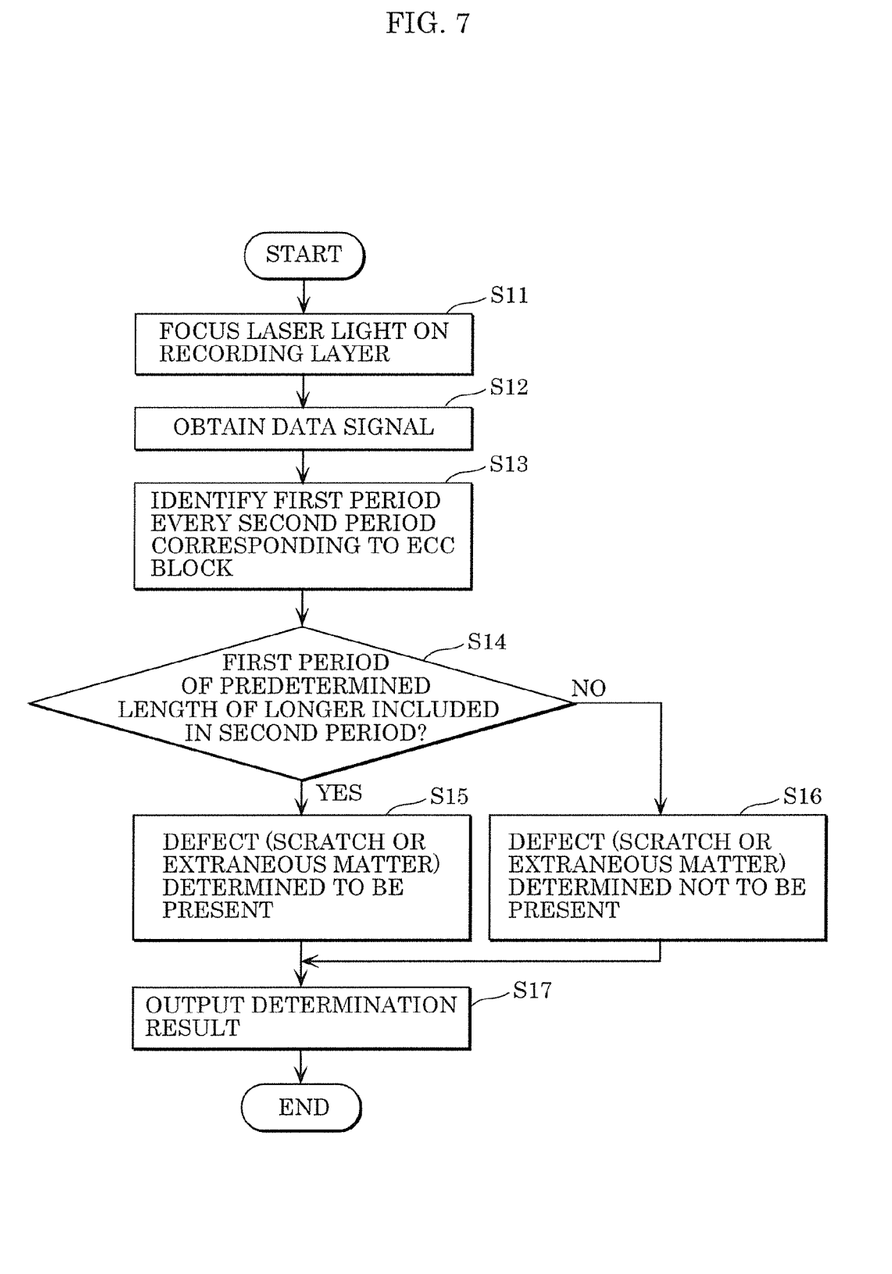
FIG. 7 illustrates a flow chart of an inspection method for an optical disc.

Next, the inspection method performed on optical disc 80 in magazine 20 by control device 60 (second controller 61) will be described. FIG. 7 illustrates a flow chart of the inspection method for optical disc 80. Note that the flow chart illustrated in FIG. 7 indicates an inspection method performed on a single optical disc 80 after second controller 61 causes picker 30 and carrier 40 to insert optical disc 80 into disc drive 50.

First, second controller 61 focuses laser light on a recording layer in optical disc 80 by controlling laser driver 57 and servo controller 54 via first controller 58 (S11). Here, second controller 61 tracks, along track 81 of the recording layer of optical disc 80, the beam spot of the laser light focused on the recording layer by causing servo controller 54 to spin spindle motor 53 via first controller 58.

Next, second controller 61 obtains a data signal dependent on the laser light reflected by the recording layer (S12). In a state in which data is recorded in the recording layer, the data signal is a signal whose signal level fluctuates in accordance with the recorded data, but this inspection method is only performed on optical discs 80 unrecorded with data. In a state in which optical disc 80 is unrecorded with data, the signal level of the data signal is typically substantially constant, and since the amount of laser light reflected decreases when there is a scratch or extraneous matter on the surface of optical disc 80, the signal level also decreases. In other words, a period in which the signal level of the data signal decreases can be interpreted as a period including a scratch or extraneous matter.

Figure 8:
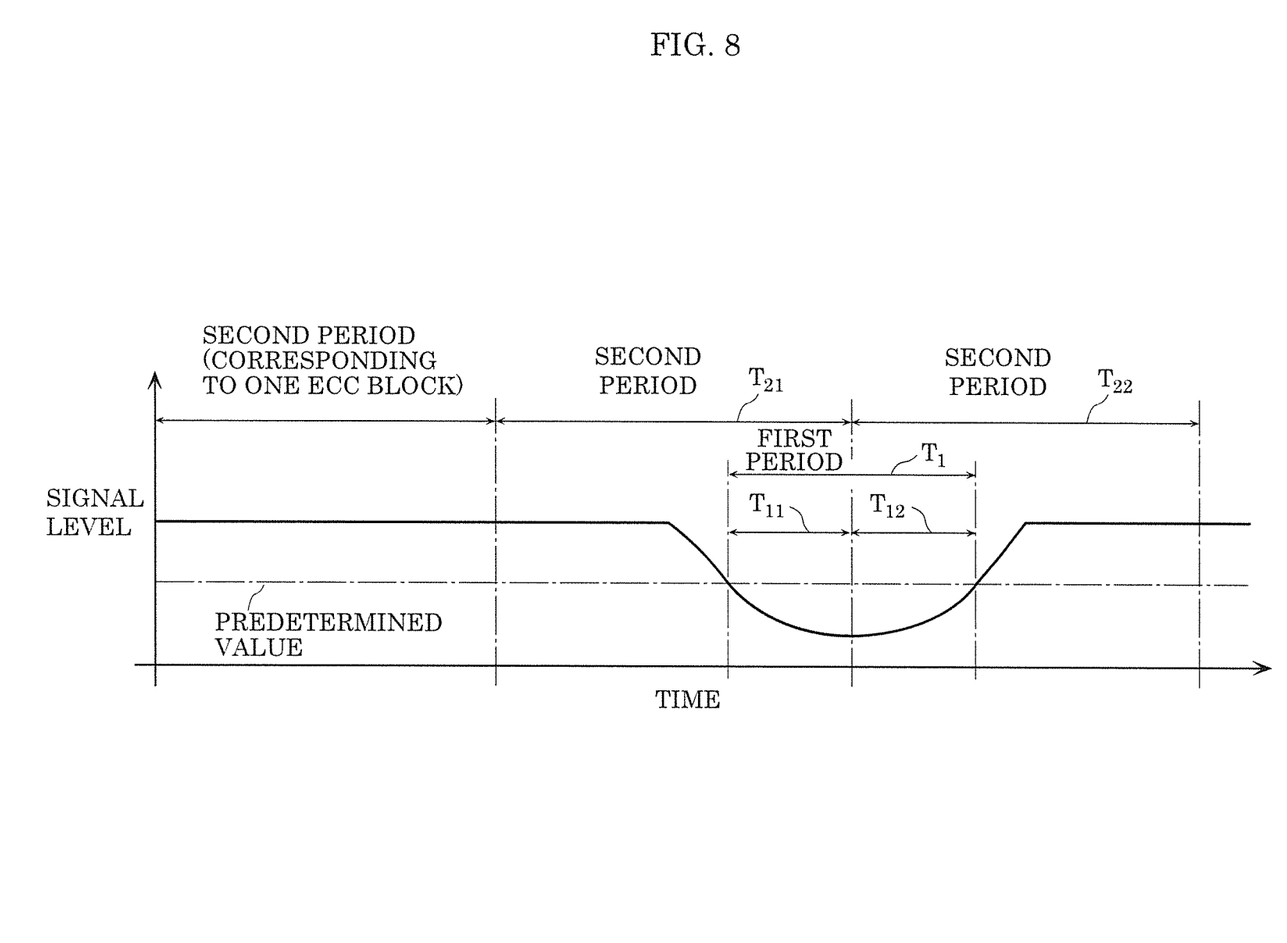
FIG. 8 is for illustrating a method for identifying a first period by a second controller.

Therefore, second controller 61 identifies a first period every second period in the data signal obtained in step S12 (S13). Here, the first period is a period in which the signal level of the obtained data signal is lower than a predetermined value, and the second period is a period corresponding to ECC block 82. FIG. 8 is for illustrating the method for identifying a first period.

FIG. 8 illustrates a data signal that is in the process of being inspected. As described above, the beam spot of the laser light focused on a recording layer is tracked along track 81 by rotating optical disc. When a target region of a surface of optical disc 80 includes a scratch or extraneous matter, the signal level of the data signal decreases during the time that the beam spot is incident on portions of track 81 overlapping the target portion. In FIG. 8, the signal level of the data signal is lower than a predetermined value in first period $T_1$.

It is conceivable that the longer first period $T_1$ is, the greater the scratch or extraneous matter is on a surface of optical disc 80. Therefore, an inspection method which determines that optical disc 80 includes a defect (i.e., is unusable) when first period $T_1$ is longer than a predetermined length is conceivable. This is because a scratch or extraneous matter is an obstruction that may make it impossible to normally record or playback data on or from optical disc 80.

However, optical disc 80 determined to be unusable by this inspection method may actually be usable. More specifically, such an optical disc 80 may be usable when first period $T_1$ spans across the border between second period $T_{21}$ and second period $T_{22}$—that is to say, when the scratch or extraneous matter is present across the border between two ECC blocks 82, as illustrated in FIG. 8.

As described above, ECC blocks 82 are units in which error correction is performed when data is played back. Error correction is possible if a region void of a scratch or extraneous matter in a single ECC block 82 can be secured, and data can typically be played back with no problem. In the example illustrated in FIG. 8, first period $T_1$ includes first period $T_{11}$ located in second period $T_{21}$ corresponding to one ECC block 82, and first period $T_{12}$ located in second period $T_{22}$ corresponding to another ECC block 82. In such a case, if the length of first period $T_{11}$ and the length of first period $T_{12}$ are each less than a predetermined length, data can typically be played back with no problem.

Therefore, in step S13, second controller 61 does not identify a first period irrespective of ECC block 82, but identifies a first period every second period corresponding to ECC block 82 in the data signal. In the example in FIG. 8, second controller 61 identifies first period $T_{11}$ included in second period $T_{21}$, and identifies first period $T_{12}$ included in second period $T_{22}$.

Note that the start and end points of the second periods (i.e., the boundary between two ECC blocks 82) in the data signal can be identified based on the address output from address identifier 55. For example, whether or not the data signal is less than or equal to the predetermined value is identified by a comparator circuit. For example, the predetermined value is, but not limited to, 50% of the maximum value of the signal level of the data signal.

Next, second controller 61 determines whether or not the lengths of first period $T_{11}$ and first period $T_{12}$ are each greater than or equal to a predetermined length (S14). The length of the first period is measured by, for example, a time counter. The predetermined length is, for example, a length equivalent to an amount of information of 600 bytes. Since the length of the second period is equivalent to an amount of information of 64 KBytes, the predetermined length is about 1% of the length of the second period. Note that the predetermined length is not particularly limited, and may be a length corresponding to a predetermined amount of information that can be error corrected.

When second controller 61 determines that at least one of the lengths of first period $T_{11}$ and first period $T_{12}$ is greater than or equal to the predetermined length (yes in S14), second controller 61 determines that optical disc 80 includes a defect (S15). In other words, second controller 61 determines that there is a scratch or extraneous matter large enough to hinder normal recording or playback of data on optical disc 80.

When second controller 61 determines that at least one of the lengths of first period $T_{11}$ and first period $T_{12}$ is less the predetermined length (no in S14), second controller 61 determines that optical disc 80 does not include a defect (S16). In other words, second controller 61 determines that there is no scratch or extraneous matter large enough to hinder normal recording or playback of data on optical disc 80.

Lastly, second controller 61 outputs the result of the determination (S17). The result of the determination is, for example, output to information terminal 110. As a result, for example, the result of the determination (inspection result) is displayed as an image on display device 120.

With this, the above-described inspection method can verify with high precision whether or not optical disc 80 is in a state in which data can be properly recorded onto or played back from optical disc 80.

Variation 1

Figure 9:
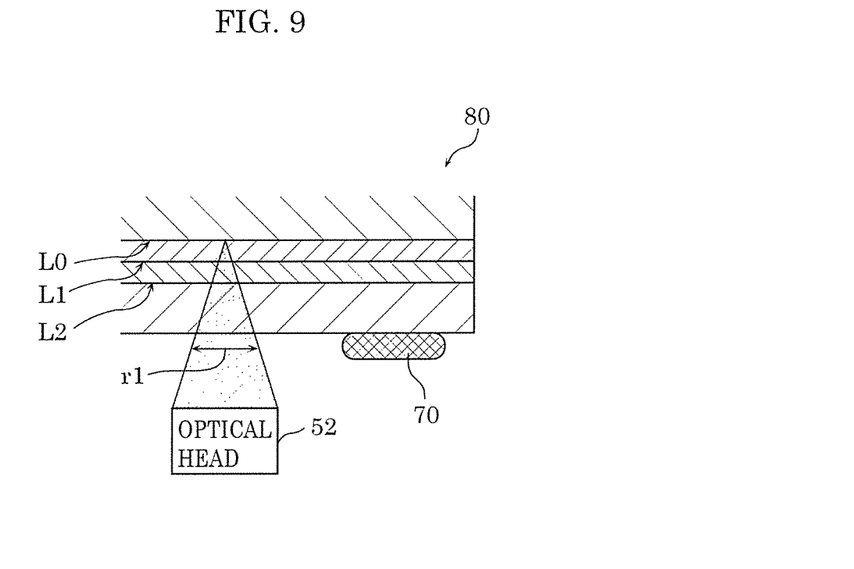
FIG. 9 is a first schematic illustration of laser light being focused on a recording layer.
Figure 10:
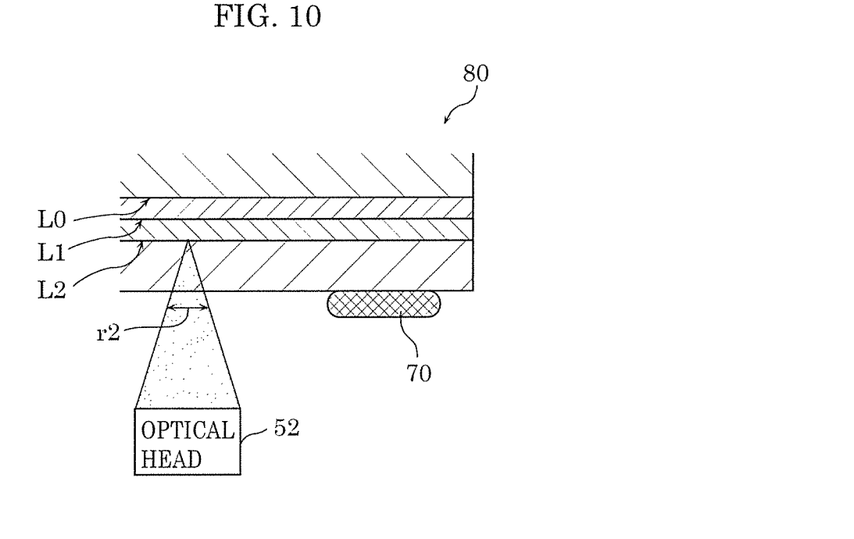
FIG. 10 is a second schematic illustration of laser light being focused on a recording layer.

As described above, optical disc 80 includes three recording layers in each of the top and bottom surfaces. In other words, optical disc 80 has a layered structure including a plurality of recording layers. Here, for example, when inspecting one of the top and the bottom surfaces of optical disc 80, the laser light may be focused onto one of the three recording layers. Here, the laser light may be focused on any one of the three recording layers. FIG. 9 and FIG. 10 schematically illustrate laser light being focused on a recording layer.

In FIG. 9, laser light is focused on Layer0, which is the recording layer furthest from optical head 52. In FIG. 10, the laser light is focused on Layer2, which is the recording layer closest to optical head 52.

Here, beam spot diameter r1 on the surface of optical disc 80 when laser light is focused on Layer0 is greater than beam spot diameter r2 on the surface of optical disc 80 when laser light is focused on Layer2. As illustrated in FIG. 9 and FIG. 10, extraneous matter 70 is on the surface of optical disc 80. As such, the smaller the beam spot diameter is on the surface, the more precise the inspection of optical disc 80 for extraneous matter 70 is. In other words, as illustrated in FIG. 10, inspection precision can be increased by focusing the laser light onto, among recording layers included in optical disc 80, the recording layer closest to optical head 52.

Variation 2

It is preferable that optical disc 80 include no scratches or extraneous matter that would hinder the recording or play back of data. Therefore, in the inspection of optical disc 80, it is ideal that the number of second periods identified is the same as the number of ECC blocks 82 included in a single recording layer, and that all of the identified second periods meet a condition that any first period included in the second periods are less than a predetermined length. With double-sided recordable optical discs, such as optical disc 80, it is ideal that the above condition is met for each of the recording layers in the top surface side as well as in the bottom surface side.

However, even when some of the plurality of identified second periods do not meet the condition—that is to say, even when optical disc 80 includes at least one ECC block 82 estimated to be unrecordable due to a scratch or extraneous matter (hereinafter referred to as a defective ECC block)—optical disc 80 can be used if the address of the defective ECC block is stored and recording to the defective ECC block is avoided. Note that defective ECC block is, in other words, an ECC block corresponding to a second period including a first period of a predetermined length or longer.

Thus, second controller 61 determines whether or not optical disc 80 includes a defect on the basis of how many second periods there are that include a first period of a predetermined length of longer—that is to say, on the basis of the number of defective ECC blocks. More specifically, second controller 61 determines that optical disc 80 includes a defect when the number of second periods including a first period of a predetermined length or longer included in the data signal (i.e., the number of defective ECC blocks in the recording layer) is greater than or equal to a predetermined number.

For example, the predetermined number may be determined in accordance with storage capacity. For example, the predetermined number is set to a number such that the total storage capacity of defective ECC blocks is less than 10% of the maximum storage capacity of a single optical disc 80.

Variation 3

Figure 11:
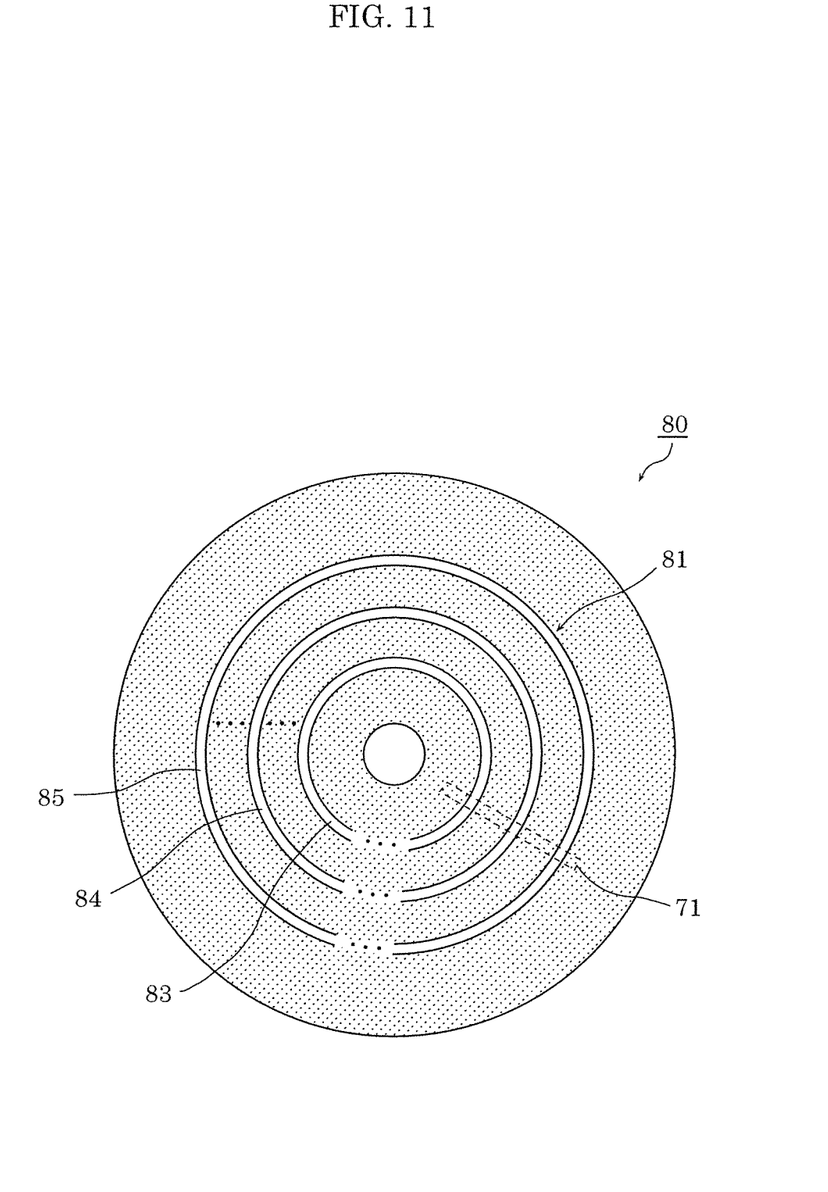
FIG. 11 schematically illustrates a method for estimating whether or not a scratch or extraneous matter that is elongated in the radial direction is present.

Second controller 61 may determine that optical disc 80 includes a defect when it is estimated that there is a scratch or extraneous matter that is elongated in the radial direction of optical disc 80. FIG. 11 schematically illustrates a method for estimating whether or not a scratch or extraneous matter that is elongated in the radial direction is present. Note that track 81 illustrated in FIG. 11 is, in actuality, a spiral-shaped track, but for illustrative purposes, depiction of track 81 is simplified.

In FIG. 11, ECC block group 83 includes a plurality of ECC blocks 82 included in the 1-th lap (innermost lap) of track 81 from the center of optical disc 80. ECC block group 84 includes a plurality of ECC blocks 82 included in the m-th lap of track 81 from the center of optical disc 80. ECC block group 85 includes a plurality of ECC blocks 82 included in the n-th lap of track 81 from the center of track 81. Note that 1, m, and n are each different natural numbers.

Here, when ECC block group 83, ECC block group 84, and ECC block group 85 each include at least one defective ECC block, it is estimated that extraneous matter 71 (or a scratch) elongated in the radial direction is present.

Therefore, when second controller 61 determines that at least one defective ECC block is included in each of ECC block group 83, ECC block group 84, and ECC block group 85, second controller 61 may determine that optical disc 80 includes a defect.

More specifically, when, in the obtained data signal, a period corresponding to the 1-th lap of track 81, a period corresponding to the m-th lap of track 81, and a period corresponding to the n-th lap of track 81 each include a second period including a first period of a predetermined length or longer, second controller 61 may determine that optical disc 80 includes a defect. Note that in the data signal, a period corresponding to the 1-th lap of track 81, a period corresponding to the m-th lap of track 81, and a period corresponding to the n-th lap of track 81 can each be identified based on the address output from address identifier 55.

With this, second controller 61 can determine that optical disc 80 estimated to have thereon extraneous matter elongated in the radial direction includes a defect.

Moreover, the 1-th lap, m-th lap, and n-th lap of track 81 are, for example, equally spaced apart, and when 1<m<n, m−1 is equal to n−m. For example, each of m−1 and n−m is an integer of 1 or higher. In this way, when, in the data signal, each of N periods corresponding to N laps that are non-adjacent and equally spaced apart include at least one second period including a first period of a predetermined length or longer, second controller 61 may determine that optical disc 80 includes a defect (where N is an integer of 2 or higher).

Note that when second controller 61 determines that at least one defective ECC block is included in each of two or more ECC block groups (for example, ECC block group 84 and ECC block group 85), second controller 61 may determine that optical disc 80 includes a defect. In other words, when, in the obtained data signal, a period corresponding to an m-th lap of track 81 from the center of optical disc 80 and a period corresponding to an n-th lap of track 81 from the center of optical disc 80 each include a second period including a first period of a predetermined length or longer, second controller 61 may determine that optical disc 80 includes a defect.

Variation 4

In the above inspection method, the result of the determination is output on a per optical disc 80 basis, but the result of the determination may be output on a per magazine 20 basis. In other words, determination of whether a defect is present or not (whether usable or not) may be performed on a per magazine 20 basis.

Here, among optical discs 80 housed in magazines 20, the top surface of optical disc 80 located in the topmost position in magazine 20 (first optical disc) is susceptible to scratches or extraneous matter. This is because it is easy for the top surface of the first optical disc to contact case 22. Similarly, among optical discs 80 housed in magazines 20, the bottom surface of optical disc 80 located in the bottommost position in magazine 20 (second optical disc) is also susceptible to scratches or extraneous matter. This is because it is easy for the bottom surface of the second optical disc to contact magazine tray 21.

Therefore, when determination of whether a defect is present or not is performed on a per magazine 20 basis, rather than performing the inspection on all optical discs 80 in magazine 20, the inspection may be performed only on the first optical disc and the second optical disc. More specifically, the inspection may be performed only on a recording layer on the top surface side of the first optical disc and a recording layer on the bottom surface side of the second optical disc.

In this case, in the inspection, laser light is focused only on a recording layer on the top surface side of the first optical disc and a recording layer on the bottom surface side of the second optical disc. In other words, inspection is only performed on two recording layers in a single magazine 20. Any of the above methods may be used to determine the presence of a defect.

Then, when a defect is determined to be present in at least one of the first optical disc and the second optical disc, a result of the determination indicating that there is a defect in magazine 20 is output.

In this way, whether or not magazine 20 includes a defect or not can be determined efficiently by selectively inspecting only a recording layer in the top surface side of the first optical disc and a recording layer in the bottom surface side of the second optical disc.

(Advantageous Effects, Etc.)

As described above, the aforementioned embodiments relate to an inspection method for a recordable optical disc 80. Each optical disc 80 includes a recording layer including a plurality of ECC blocks 82, which are units in which error correction is performed when data is recoded. ECC blocks 82 are one example of recording units. The inspection method includes focusing (S11) laser light on a recording layer and obtaining (S12) a data signal dependent on the laser light reflected by the recording layer. The inspection method also includes identifying (S13) a first period every second period in the obtained data signal obtained, the first period being a period in which a signal level of the data signal is lower than a predetermined value, and each of the second periods corresponding to ECC block 82, to determine (S14 through S16) whether optical disc 80 includes a defect or not, and outputting (S17) a result of the determination. The data signal is one example of the electrical signal.

With such an inspection method, since determination of whether there is an obstruction, such as a scratch or extraneous matter, present is performed on a per ECC block 82 basis, it is possible to verify with high precision whether or not optical disc 80 is in a state in which data can be properly recorded thereon.

Moreover, in the determining, when the length of the first period in a second period in the obtained data signal is greater than or equal to a predetermined length, optical disc 80 may be determined to include the defect.

With this, the above inspection method is capable of, when inspecting optical disc 80, taking into consideration whether or not error correction of ECC block 82 is possible when optical disc 80 is recorded with data, for example.

Moreover, in the determining, determination of whether or not optical disc 80 includes a defect or not may be based on how many of the second periods in the obtained data signal include a first period of a predetermined length of longer, such as in Variation 2.

With this, the above inspection method is capable of, when inspecting optical disc 80, taking into consideration necessary storage capacity, for example.

The plurality of ECC blocks 82 may form a spiral track 81 in the recording layer, and in the determining, when, in the obtained data signal, (i) a period corresponding to an m-th (where m is a natural number) lap of track 81 from the center of optical disc 80 and (ii) a period corresponding to an n-th (where n is a natural number different from m) lap of track 81 from the center of optical disc 80 each include a second period including a first period of a predetermined length or longer, optical disc 80 may be determined to include the defect, such as in Variation 3.

With this, the above inspection method is capable of determining that optical disc 80 estimated to have thereon a scratch or extraneous matter elongated in the radial direction includes a defect.

Moreover, optical disc 80 may have a layered structure including a plurality of recording layers, and in the focusing, the laser light may be focused on, among the plurality of recording layers, a recording layer closest to optical head 52 that emits the laser light, such as in Variation 1.

This reduces the size of the beam spot diameter on the surface of optical disc 80. Consequently, the above inspection method is capable of inspecting for the presence or absence of extraneous matter with high precision.

Moreover, as in Variation 4, among a plurality of optical discs 80 stacked in magazine 20 in a top-bottom direction, each of which includes a recording layer on each of the top surface and the bottom surface, only a first optical disc located in an topmost position and a second optical disc located in a bottommost position may be subject to the inspection method. In the focusing, the laser light may be focused only on the recording layer on the top surface of the first optical disc and the recording layer on the bottom surface of the second optical disc. In the outputting, when at least one of the first optical disc and the second optical disc is determined to include the defect in the determining, a result indicating that the magazine is defective may be output.

With this, the inspection is selectively performed on only a recording layer of optical disc 80 susceptible to scratching or extraneous matter 70. Consequently, the above inspection method is capable of efficiently inspecting for the presence or absence of a defect in magazine 20.

Moreover, the inspection method may be performed on optical disc 80 unrecorded with data.

With this, the above inspection method can determine whether or not optical disc 80 unrecorded with data includes a scratch or extraneous matter, Moreover, as described above, ECC blocks 82 are one example of the recording units. In other words, each recording unit may be an ECC block.

With this, the above inspection method is capable of inspecting for the presence or absence of an obstructive scratch or extraneous matter on a per ECC block 82 basis.

OTHER EMBODIMENTS

Hereinbefore embodiments have been presented as examples of the techniques disclosed in the present disclosure. However, the techniques according to the present disclosure are not limited to the above embodiments; various modifications, substitutions, additions, and omissions may be made to the above embodiments. Moreover, various elements described in the above embodiments may be combined to achieve a new embodiment.

Hereinafter, examples of other embodiments will be described.

In the above embodiments, the inspection method is executed by the second controller in the control device, but the inspection method may executed by the first controller in the disc drive. Moreover, the processes included in the inspection method may be divided and assigned to the various elements included in the information recording apparatus.

Moreover, in the above embodiments, elements such as the first controller and the second controller are configured as dedicated hardware, but the elements may be realized by executing a software program suitable for each element. Each element may be realized as a result of a program execution unit of a CPU or processor or the like loading and executing a software program stored in a storage medium such as a hard disk or semiconductor memory.

Moreover, the inspection method according to the above embodiments is applicable to various kinds of recordable optical discs. For example, the inspection method is applicable to recordable discs such as Archival Discs (AD)™, Blu-ray Discs (BD)™, DVDs, and CDs. Moreover, the discs subjected to the inspection method may be double-sided recordable discs, and may be single-sided recordable discs.

Moreover, the order in which the processes in the inspection method described in the above embodiments are executed is one example. The order of the processes may be changed and a portion of the processes may be executed in parallel.

Moreover, general or specific aspects of the present disclosure are not limited to the inspection method, and may be realized as a system or apparatus. Moreover, general or specific aspects of the present disclosure may be realized as an integrated circuit or a computer-readable storage medium, such as a CD-ROM.

For example, the present disclosure may be realized as the disc drive, information recording apparatus, or information recording system described in the above embodiments. Moreover, the present disclosure may be realized as a program for causing a computer to execute the above inspection method, and may be realized as a non-transitory recording medium on which the program is recorded.

As described above, embodiments have hereinbefore been described as examples of the techniques in the present disclosure. To this extent, the accompanying drawings and detailed description are provided.

Thus, the elements set forth in the accompanying drawings and detailed description include not only elements essential to overcome the problems but also elements not necessary to overcome the problems for the purpose of illustrating the above techniques. Thus, those unnecessary elements should not be deemed essential due to the mere fact that they are described in the accompanying drawings and the detailed description.

As the above embodiments illustrate techniques according to the present disclosure, various modifications, substitutions, additions and omissions are possible in the scope of the appended claims and equivalents thereof.

INDUSTRIAL APPLICABILITY

The present disclosure is applicable as an inspection method for a recordable optical disc.

What is claimed is:

1. An inspection method for an optical disc that is recordable, the inspection method comprising:

focusing laser light on a recording layer included in the optical disc, the recording layer including a plurality of recording units in which error correction is performed when the optical disc is recorded with data;

obtaining an electrical signal dependent on the laser light reflected by the recording layer;

determining whether the optical disc includes a defect or not by identifying a first period every second period in the electrical signal obtained, the first period being a period in which a signal level of the electrical signal is lower than a predetermined value, and each of the second periods corresponding to one of the plurality of recording units; and outputting a result of the determining, wherein among a plurality of optical discs stacked in a magazine in a top-bottom direction, each of which is the optical disc and includes the recording layer on each of a top surface and a bottom surface, only a first optical disc located in an topmost position and a second optical disc located in a bottommost position are subject to the inspection method, in the focusing, the laser light is focused only on the recording layer on the top surface of the first optical disc and the recording layer on the bottom surface of the second optical disc, and in the outputting, when at least one of the first optical disc and the second optical disc is determined to include the defect in the determining, the result indicating that the magazine is defective is output.

\* \* \* \* \*